United States Patent [19]
Reier

[11] Patent Number: 5,217,170
[45] Date of Patent: Jun. 8, 1993

[54] METHOD FOR BOTH COOLING AND PNEUMATICALLY SCRUBBING A CALCINED, PARTICULATE MATERIAL

[75] Inventor: Gerald J. Reier, Fort Worth, Tex.

[73] Assignee: GMD Engineered Systems, Inc., Forth Worth, Tex.

[21] Appl. No.: 833,925

[22] Filed: Feb. 11, 1992

[51] Int. Cl.$^5$ .......................................... B02C 23/00
[52] U.S. Cl. ........................................ 241/5; 241/17; 241/23; 241/24; 241/DIG. 10; 164/5
[58] Field of Search ............... 241/5, 17, 23, 24, 39, 241/65, DIG. 10; 164/5

[56] References Cited

U.S. PATENT DOCUMENTS

| | | | |
|---|---|---|---|
| 2,813,318 | 11/1957 | Horth | 241/DIG. 10 X |
| 3,907,213 | 9/1975 | Kauffman | 241/DIG. 10 X |
| 4,177,952 | 12/1979 | Rikker | 241/DIG. 10 X |
| 4,478,572 | 10/1984 | Selli | 164/5 X |
| 4,549,698 | 10/1985 | Andrews | |
| 4,569,696 | 2/1986 | Sandstrom et al. | 241/DIG. 10 X |
| 4,978,076 | 9/1990 | Andrews et al. | |

FOREIGN PATENT DOCUMENTS 51-3690 2/1976 Japan ........................ 164/5

*Primary Examiner*—Mark Rosenbaum
*Assistant Examiner*—Frances Chin
*Attorney, Agent, or Firm*—Charles D. Gunter, Jr.

[57] ABSTRACT

A method is shown for removing minute traces of thermally fused foundry bonding clays from foundry sands reclaimed by a thermal sand reclaimer. The sand grains are passed to a dual fluid bed sand cooler-scrubber having sparge tubes for fluidizing air distribution, finned water cooling tubes and baffle plates for directing sand travel across the tube banks. The fluidized bed extends under a series of dry scrubber cells where the sand grains are hurled through blast tubes toward target plates by blast nozzles. Air current created within the interior of the device creates a controlled negative atmosphere which carries off unwanted traces of oxides and clays, as well as unwanted fine sand grains. The sand grains which are suitable for reuse are captured and deflected into a discharge section of the fluid bed where they flow over a weir by gravity and are discharged for re-use.

9 Claims, 2 Drawing Sheets

METHOD FOR BOTH COOLING AND PNEUMATICALLY SCRUBBING A CALCINED, PARTICULATE MATERIAL

BACKGROUND OF THE INVENTION

1. Field of the Invention

The present invention relates generally to the treatment of used foundry sands and, more specifically, to a method for removing minute traces of thermally fused foundry bonding clays consisting principally of Kaolinite ($AL_2O_3 2SiO_2 H_2O$) or Montmorillonite ($AL_2O_3 4SiO_2 4-7H_2O$) from the cracks, crevices, and cleavage plains of used foundry sand grains and for controlling the grain distribution of the finished products from a thermal sand reclaimer.

2. Description of the Prior Art

Foundry sand is commonly used to make core molds into which ferrous and non-ferrous metals are cast. The core mold consists of sand bonded with special additives including inorganic binders such as clay, and organic resin binders such as phenol, melamine, or urea formaldehyde.

Previously, after the casting has set within the mold, the mold was broken away and discarded. Various factors, such as the depletion of natural sand deposits and the cost of disposing of used sand in accordance with recent environmental regulations, have now made it more economical and advantageous to reclaim the used sand for repeated use.

At the present state of the art, random mixtures of waste clay and resin bonded foundry sands are reclaimed for re-use in the mold and core-making processes by subjecting them to a multi-step reclamation process including: (1) Lump breaking to uniform granulation, (2) calcination in various types of furnaces, (3) post cooling in water-cooled fluid beds and (4) post scrubbing by either mechanical centrifugal or pneumatic attrition. The post scrubbing steps are necessitated due to the presence of minute traces of fused clays and metallic oxides on the sand grains which are the result of the sand grains being subjected to the high temperatures that occur at the metal mold interface during the metal pouring phase of the foundry casting process. It is these minute traces of clays and oxides that significantly reduce the strength of the acid catalyzed synthetic resin bonding systems, when thermally reclaimed sands are not post-scrubbed prior to re-use for mold and core making. Additionally, post scrubbing assures consistent control of the final screen distribution of the finished product and provides a reclaimed sand with properties and characteristics very nearly equal to the properties and characteristics of new sand, thereby assuring the rebondability of the reclaimed sand within the foundry core and molding processes.

Techniques are known in the prior art for carrying out the general steps of the multi-stage reclamation process described above. For example, U.S. Pat. No. 4,549,698—Oct. 29, 1985 to Andrews, entitled "Method of Reclaiming Foundry Sand", and assigned to the assignee of the present invention, presented a novel method for reclaiming mixtures of clay and resin bonded sands. The method utilized a triple fluid bed calcining reactor but did not specifically describe the scrubbing stage of the method. See also, U.S. Pat. No. 4,978,076, issued Dec. 18, 1990 to Andrews and Reier, entitled "Method of Separating Hazardous, Substances in Waste Foundry Sands." The method described therein utilizes a triple fluid bed thermal reactor, a second stage water-cooled sand cooling unit and a third stage pneumatic attrition scrubber. Prior art pneumatic attrition scrubbers are described in such references as U.S. Pat. Nos. 2,813,318 by Horth; 3,088,183 by McIllivine; 3,825,190 by Kauffman; 3,907,213 by Kauffman; and 4,177,952 by Rikker.

The dry impact type scrubbers described in the above cited references are all claimed to be mechanical improvements over the prior art due to more efficient scrubbing. In all cases, only pneumatic scrubbing action of the sand grains is used for separating the fused grains, sand grain clusters, stripping off carbonaceous matter and spent binders. The sand grains are propelled out of a static bed, by a high pressure stream of air, up a vertical blast tube to impact against a layer of sand grains held against a conical target plate before falling back down into the static sand bed.

This action is repeated through as many blast tubes as are necessary to clean the sand grains. The output capacity is related to the number of cells in series installed in a unit. "Fines" are removed via the exhaust systems in an uncompensating and non-controlled manner. Although the draft fan provided on the exhaust system creates a negative pressure, this negative pressure is continually varying, being influenced by the atmospheric conditions which affect the characteristics of the air, the dust loading to the downstream fabric filter, the design of the exhaust system as well as the condition of the filtering media within the downstream fabric filter. These conditions are continually varying due to dust loading and conditions external to the filtering equipment.

The energy consumed in the prior art scrubbing systems of the type described is almost identical to the energy required for attrition reclamation of the used sand. For example, data published by National Engineering Company, specifies the following blast air requirements for scrubber units of the type under consideration:

TABLE I

| CAPACITY | 1-TPH | 2-TPH | 3-TPH | 4-TPH | 5-TPH |
|---|---|---|---|---|---|
| NUMBER OF CELLS | 2-CELL | 4-CELL | 6-CELL | 8-CELL | 10-CELL |
| EXHAUST CFM | 1800 | 3000 | 4200 | 6600 | 9000 |
| MOTOR HP | 25 | 40 | 60 | 75 | 100 |
| COMPRESSOR CFM (3 PSI) | 1150 | 1800 | 2800 | 3750 | 4500 |

For the total amount of work required to attrition reclaim 60% of waste clay bonded foundry sands, the cost per ton for energy consumed can perhaps be justified. However, to employ these dry scrubbing units to eliminate the minute traces of fused clay and metallic oxides from the cracks, crevices and cleavage plains of the thermally calcined sand grains introduces a significant waste of electrical energy into the overall sand reclamation process and dramatically reduces the yield from the 60% mentioned to 40%-45%.

In addition to the inefficient use of energy inherent in the scrubbing stage of existing reclamation systems, another problem exists in achieving consistent control of the final screen distribution of the finished reclaimed sand grain product. The necessary control for a consistent grain distribution (sieve analysis; screen distribution; screen analysis; all synonymous with grain distribution) is nonexistent in the presently available systems and thus produces a non-consistent finished product which is very difficult to use in a production operation on a continuous basis. This existing problem is managed, at the present time, by blending in a high percentage of new sand, a percentage in the range of 30% to 70% depending upon the severity of the problem surrounding the cleanliness of the sand and the grain distribution and most importantly, the consistency of both.

The present invention has as its object to provide a method for substantially reducing the energy required for "post" dry scrubbing calcined sand grains in a used foundry sand reclamation process to eliminate residual minute traces of fused clay and metallic oxides from the cracks, crevices and cleavage plains of the sand grains.

Another object of the present invention is to provide a continuously processing "cooler-scrubber" to closely match the output of the thermal reclamation equipment used in calcining the used foundry sand grains, thereby eliminating the cost of surge bins, conveying equipment and special batching controls.

Another object of the present invention is to eliminate the need for mechanical moving parts of the type used to control the flow of sand streams within the sand scrubbing zone of the scrubber to improve reliability of operation and down time for routine maintenance.

Another object of the invention is to automatically control the retention of silica fines in the scrubbing zone of the scrubber to ensure abrasive action in the cracks, and crevices of the sand grains to remove the minute traces of fused clays and metallic oxides.

A further object of the invention is to integrate the "post cooling unit" stage of the reclamation process with the "post dry scrubbing unit" stage to eliminate the material handling equipment between the two stages and further reduce the electrical energy required in the overall reclamation process.

Another object of the invention is to automatically control the "post dry scrubbing" stage negative atmosphere within very narrow limits to consistently remove the minute traces of fused clays and metallic oxides from the sand mass once they have been separated from the sand grains as well as remove the undesirable "fines" from the sand mass, assuring a final reclaimed product suitable for reuse in the foundry processes.

Another object of the invention is to increase the process efficiency for the recovery of a national resource and its conservation.

Another object of the invention is the reduction of waste material disposal cost and a reduction in foundry manufacturing costs.

Another object is to increase the "yield" in true silica by integrating the cooler-scrubber with the thermal process.

SUMMARY OF THE INVENTION

The present method is used to both cool and pneumatically scrub a calcined particulate material, such as a used foundry sand, having cracks, crevices and cleavage plains and having minute amounts of inorganic, contaminants and metallic oxides adhering thereto. The incoming particulate material from the thermal reclaimer, which is generally at a temperature in the range from about 700 to 1500 degrees F., is passed to the primary cooling zone of a cooler-scrubber unit having an interior with an inlet opening and having an outlet opening for discharging scrubbed and cooled sand. The interior of the cooler-scrubber unit forms a bed of particulate material between the inlet and outlet openings of the unit. Fluidizing air is supplied to the continuous bed of particulate material to form a fluid bed whereby particulate material entering the inlet opening is moved in the direction of the outlet opening. Fluidizing air is also drawn off at a controlled rate through a cooling zone exhaust duct to thereby create a controlled negative mechanical draft within the interior of the cooler scrubber unit.

A plurality of cooling tubes are located within the fluid bed. A cooling medium is circulated within the cooling tubes. The particulate material passing through the interior of the cooler-scrubber unit between the inlet opening and outlet opening contacts the cooling tubes, contact with the cooling tubes and with the fluidizing air serving to continually cool the particulate material to a temperature within the range from about 85 to 120 degrees F.

The particulate material is then passed from the primary cooling zone of the compound fluid bed to a scrubbing zone which is also located within the interior of the unit. The scrubbing zone includes at least one blast nozzle which forces air under pressure upwardly within an associated vertically oriented blast tube toward a target plate. Collision of the particulate material with the target plate promotes the release of kinetic energy, whereby the cracks, crevices and cleavage plains of the particulate material is scoured to remove the minute traces of inorganic contaminates and metallic oxides.

Preferably, the cooling zone exhaust duct provided in the cooling zone of the unit, communicates with a main exhaust duct. A damper, provided in the cooling zone exhaust duct, controls the rate of elutriation of inorganic fines and silica fines produced in the primary cooling zone during the passage of the particulate material from the inlet opening to the outlet opening of the cooler-scrubber. In the scrubber zone the particulate material is accelerated by the blast nozzle within the blast tube and is entrained with returned particles prior to being rapidly accelerated by the blast tube to thereby promote release of kinetic energy upon impact with the target plate.

The scrubber zone is also provided with a scrubber exhaust duct which merges with the cooler exhaust duct and which communicates with the main exhaust duct. A negative pressure created within the main exhaust duct captures unwanted fines as well as scoured inorganic contaminants and metallic oxides present within the scrubbing zone.

Most preferably, the particulate material in the scrubbing zone of the compound fluid bed is entrained by the blast nozzle and propelled into the blast tube via a wear collar prior to being rapidly accelerated up the interior of the blast tube. The blast tube is also preferably provided with a tapered choke section at an upper end thereof to concentrate the particulate material as it emerges from the blast tube to impact the target plate in order to concentrate the release of kinetic energy over a definitive area of the target plate.

The average particle size of the particulate material in the scrubbing zone is determined by a plenum pressure control damper provided in a branch exhaust duct provided off the main exhaust duct, together with a cooling zone exhaust duct damper provided in the exhaust duct from the cooling zone.

Additional objects, features and advantages will be apparent in the written description which follows.

DETAILED DESCRIPTION OF THE INVENTION

Figure 1:
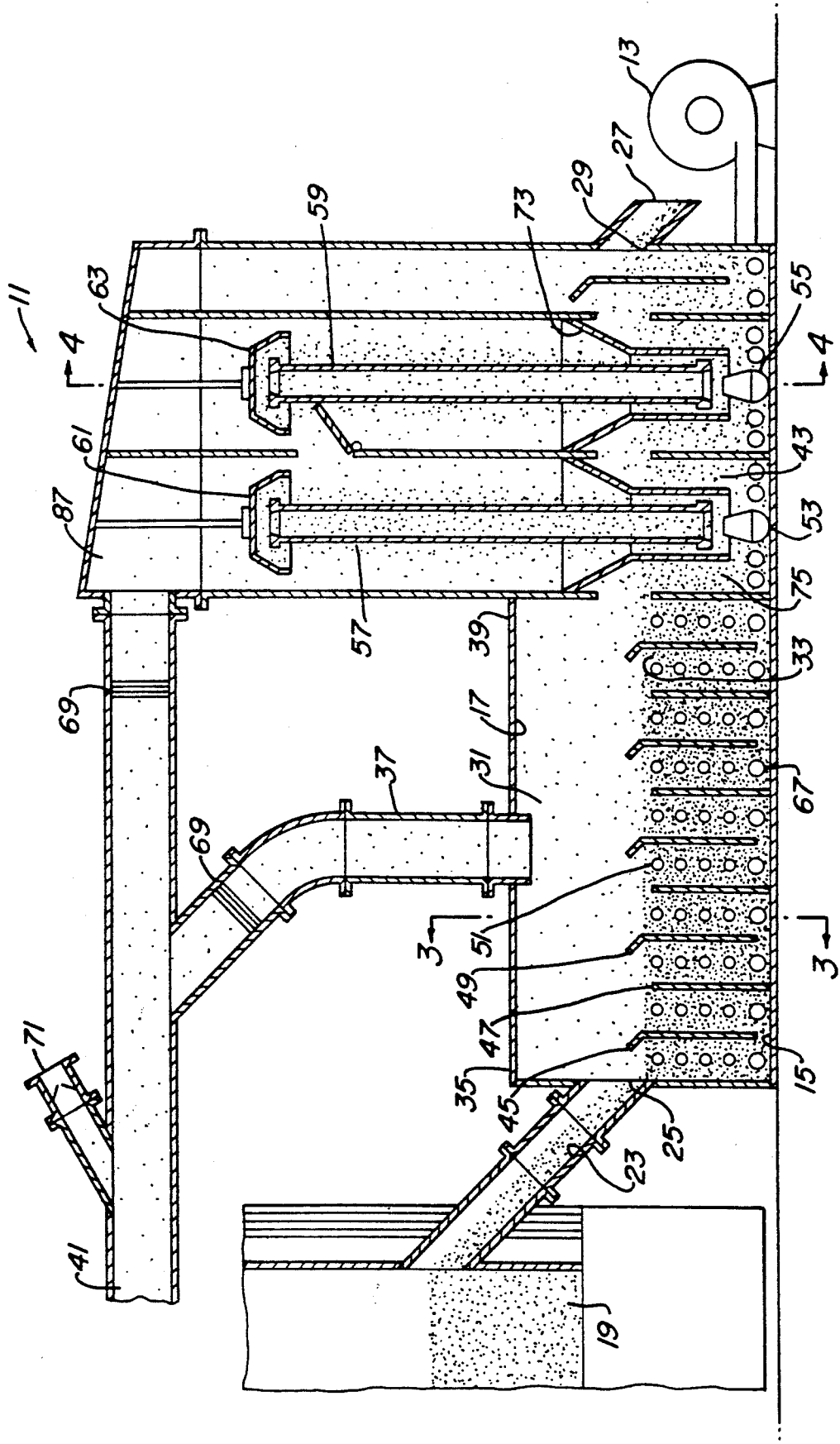
FIG. 1 is a diagrammatic side elevation in section of the fluid bed sand cooler-scrubber unit used in practicing the method of the invention.

The presently described method and apparatus are used to ensure that the residual and minute traces of fused clay and metallic oxides in the cracks, crevices and cleavage plains of thermally calcined foundry sand grains are completely removed along with unwanted silica "fines." As will be apparent in the description which follows, the method of the invention is highly efficient in terms of electromechanical energy consumed per ton of capacity of sand being treated.

The present method is used to both cool and pneumatically scrub a calcined particulate material, such as a used foundry sand, having cracks, crevices and cleavage plains and having minute amounts of inorganic contaminants and metallic oxides adhering thereto. The method of the invention will be described first with reference to FIG. 1, where a cooler-scrubber apparatus is indicated generally as 11. The cooler-scrubber 11 is, in this case, provided with a single source of low pressure air supplied by a 3 psi turbo blower 13, driven by a direct coupled electric motor. The turbo blower 13, as will be described, provides a source of fluidizing air for the compound fluid bed 15 located within the interior 17 of the cooler-scrubber unit 11. Entering particulate material to be treated is passed from a sand reclamation furnace 19 over a weir 21 and through a downwardly sloping passageway 23 to an inlet opening 25 of the cooler-scrubber 11. The interior 17 of the cooler-scrubber unit 11 is also provided with an outlet opening 27 including a weir 29. The sand reclamation furnace 19 may be of various designs, and is normally but not necessarily directly coupled to the inlet opening 25 of the cooler-scrubber unit 11.

The sand feed to the cooler-scrubber unit 11 is fed by gravity into a primary cooling zone 31 at a temperature in the range from about 700°–1500° F. Because the sand feed entering the cooler-scrubber unit 11 is a fluidized mass of particulate, the sand conforms to the laws of hydraulic flow. It seeks its own level and will flow freely over a weir. As the sand flows into the fluidized bed of the primary cooling zone 31 at a predetermined rate, it will raise the level of the whole bed. As a result, an identical volume of scrubbed particulate material will be discharged from the output opening 27 at the opposite end of the cooler-scrubber unit 11.

The depth of the fluid bed (indicated at 33 in FIG. 1) will vary depending upon the particular application. The depth 33 of the fluid bed balances the pressure drops across the cooler-scrubber unit in order to control the elutriation of fine clay dust and silica sand fines within the unit. Although both of these materials are elutriated from the fluid bed surface 33 at the feed end 35 of the unit 11 due to the increased velocity of the heated, fluidizing air provided by the blower 13. Blower 13 is connected to a common manifold (14 in FIGS. 3 and 4) which communicates air under pressure through conduits 67 and apertures 68 to the particulate material in the fluid bed.

Only the fine clay dust is drawn off in the primary cooling zone 31 of the device. This is accomplished by means of a cooling zone exhaust duct 37 provided in the roof 39 of the primary cooling zone of the device. The exhaust duct 37 is connected to a main duct 41 which is connected to the cloth filter (not shown) of a traditional baghouse having an induced draft fan for creating a negative draft within the main duct. The silica sand fines present in the particulate material being treated are collected and transferred to a scrubber section 43 of the device, as will be described.

In order to draw off the fine clay dust through the cooling zone exhaust duct 37 while passing the silica sand fines to the scrubber section 43, a series of baffles 45 are provided within the fluid bed 33. As shown in FIG. 1, the entering particulate material passes through the passageway 23 over baffles 47 and under baffles 49 on its way to the output opening 27 of the device. In flowing under and over the baffles 47, 49, the sand is in close contact with a plurality of finned water cooling tubes 51 arranged in vertical stacks within the fluid bed 33 between the series of baffles 47, 49. Cooling water is recirculated from the cooling tubes 51 through a conventional evaporative type water cooling tower.

Figure 3:
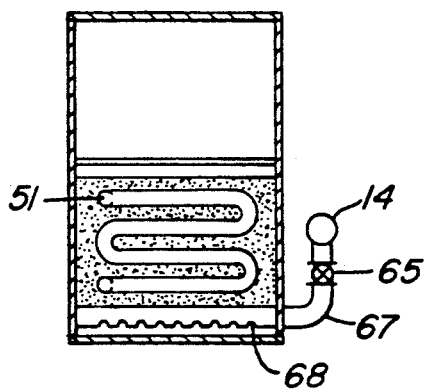
FIG. 3 is a diagrammatic end elevation at section "AA" in FIG. 1 of the fluid bed sand cooler-scrubber unit used in practicing the method of the invention.
Figure 4:
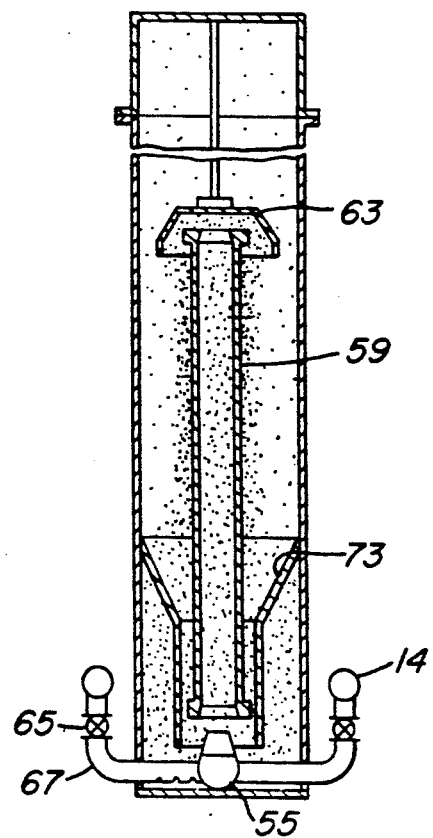
FIG. 4 is a diagrammatic end elevation at section "BB" in FIG. 1 of the fluid bed sand cooler-scrubber used in the practicing the method of the invention.

As the sand flows from the inlet opening 25 toward the outlet opening 27 of the device, it enters the i scrubber section 43 of the device. Prior to entering the scrubber section 43, the sand has been cooled within a temperature range from about 85° to 120° F. The scrubbing section of the device 43 includes a plurality of blast nozzles 53, 55 which feed by the turbo blower 13. As shown in FIGS. 3 and 4, the blast nozzles are fed from the common manifold 14 through control valves 65. Each of the blast nozzles 53, 55 forces air under pressure upwardly within an associated, vertically oriented blast tube 57, 59 toward a target plate 61, 63 to promote the release of kinetic energy upon impact with the target plate. In this manner, the cracks, crevices and cleavage plains of the particulate material are scoured to remove the minute traces of inorganic contaminants and metallic oxides.

The degree of "fines" elutriated from the cooling zone 31 of the device is controlled by pre-setting the fluidizing air velocity through the fluid bed 33. This is accomplished by manual adjustment of the series of control valves (65 in FIGS. 3 and 4) provided on each of the associated sparge tubes 67 and pre-setting the cooling zone exhaust duct damper 69. The elutriated clay is captured by the negative draft the cooling zone exhaust duct damper 69 provided in the cooling zone exhaust duct 37 prior to joining the main duct 41 leading to the baghouse filter unit. A predetermined optimum negative pressure is maintained by means of a plenum pressure control damper 71 provided in a branch 91 of the main duct 41. An additional damper 94 can also be provide in the scrubber exhaust duct 93. Clay dust passing through the main duct 41 is conveyed to the cloth filter of the baghouse.

Due to the density differential between the clay dust (approximately 54 pounds per cubic foot) and the silica dust (approximately 110 pounds per cubic foot), the clay is carried out and conveyed to the cloth filter baghouse in the system while the silica fines remain in the fluid bed and are passed to the scrubber section 43. These silica fines, in the particle size range from about 60 to 40 microns in size, are retained in the scrubber fluid bed section 43. These silica fines are able to "scour" the minute traces of used clay and metallic oxides from the cracks, crevices and cleavage plains of the larger sand grains present in the scrubber section 15 during multiple passes up the blast tubes 57, 59 to impact the target plates 61, 63. The fines are returned to the fluid bed portion of the scrubber section 43 by gravity through the blast tube shrouds 73.

The number of sand grains passing through the blast tubes 57, 59 from the fluid bed portion 75 of the scrubber section 43 is preferably pre-set in the range from about 200-240 grains per minute, by adjusting the sand grain velocity of the blast tubes 57, 59 in the range from about 9000 to 10000 feet per minute by manual adjustment of each control valve 65 which feeds each blast nozzle 53, 55. An adjustable return valve (77 in FIG. 2) allows the particulate material to be re-circulated between the scrubbing cells, if required. The volume of particulate material recirculated per hour is pre-set as a percentage by weight of the scrubbing process between any two adjacent cells.

Figure 2:
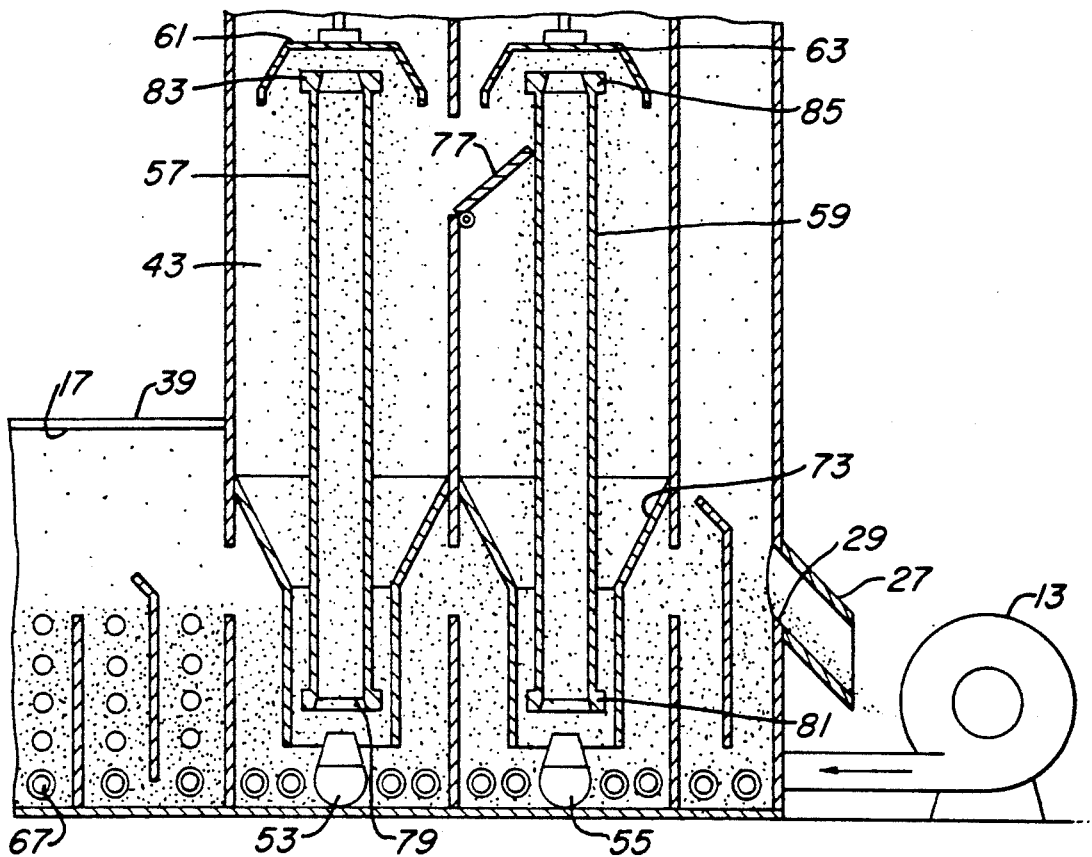
FIG. 2 is an enlarged diagrammatic view of the scrubber section of the unit of FIG. 1, showing the blast tubes and illustrating the sand circulation to and from the fluidized bed.

Referring to FIG. 2, the mass flow of sand through the fluidized bed of the scrubber section 43 is illustrated in greater detail. The cell blast tubes 57, 59 are provided with replaceable wear collars 79, 81 at the lower ends thereof and replaceable "choke" collars 83, 85 at the upper ends, respectively thereof. For instance, these inserts can be threadedly engaged on the respective ends of the blast tubes 57, 59. The choke collars 83, 85 have an internal taper in the range from about 5 to 10°. By adjusting the bore of the "choke", the mass of the particulate material emerging from the blast tubes 57, 59 will be concentrated in a dense phase as it impacts the target plates 61, 63 in order to concentrate the release of its kinetic energy over a definitive area of the target. In the absence of a "choke", the particulate material tends to spread out over a relatively wide area as it emerges from the blast tube. This results in dissipation of the available kinetic energy when the particulate material impacts the target.

The operation of the devices used in practicing the method of the invention will now be described in greater detail. With reference to FIG. 1, thermally calcined sand, pre-cooled to the 700°-1500° F. temperature range is discharged from the sand calcining bed 19 and is normally fed by gravity from that unit to the compound fluid bed 15 of the invention, entering at the inlet opening 25. The primary cooling zone 31 of the device utilizes sparge tubes 67 (FIG. 4) for fluidizing air distribution and finned water cooling tubes 51, as well as the baffle plates 47, 49 for directing the sand travel across the tube banks. The fluidized bed extends from the primary cooling zone 31 into a scrubbing zone 43 and beneath a plurality of dry scrubber cells including blast tubes 57, 59.

In the scrubber section 43 of the device, sand grains flowing to the scrubber section are withdrawn from the fluidized bed by the velocity of the blast air as it emerges from the nozzles 53, 55 submerged in the bottom of the fluid bed. The sand grains are forced up each blast tube 57, 59 causing the grains to impact the layer of sand grains already held against the respective target plate 61, 63 by the blast air.

Having given up their kinetic energy, the sand grains fall back down by the force of gravity to the fluid bed of the scrubber section 43 where they are collected and again withdrawn and blasted up the blast tubes 57, 59 and continue to recirculate until captured by the overflow weir current.

It is during this stage of the operation of the device that the air current created within the controlled negative pressure atmosphere within the plenum section (87 in FIG. 1) carries off the remaining unwanted "free" minute traces of clays and oxides and the unwanted fine sand grains, directing them through the scrubber exhaust duct 93 to the fabric filter portion of the baghouse unit located downstream of the main duct 41. All sand grains suitable for reuse are captured and deflected into the discharge section of the scrubber section fluid bed (89 in FIG. 1) where they flow over the weir 29 by gravity and are discharged as clean, cooled, reclaimed sand ready for re-use at a temperature in the range from about 85° to 120° F.

An invention has been provided with several advantages. It is because the sand grains are in a fluidized or dynamic state, when withdrawn into the blast air stream of the blast tube cells, instead of in a static state as in the prior art, that the force required to overcome the static inertia of the packed sand grains is eliminated. The remaining dynamic force in the system is reduced to 64% of that required by the prior art. Because the accurately controlled negative pressure atmosphere in the scrubber section plenum is maintained, the unwanted "free" minute traces of clays and oxides and the unwanted fine sand grains are removed and directed to the fabric filter unit. This leaves a finished product with an acceptable grain fineness and characteristics suitable for re-use without dilution of blending with new sand. The following tabulation is a comparison with the prior art, conventional pneumatic scrubber unit in order to illustrate the electrical energy savings achieved by the present invention:

TABLE II

| CAPACITY | 1-TPH | 2-TPH | 3-TPH | 4-TPH | 5-TPH |
| --- | --- | --- | --- | --- | --- |
| NUMBER OF CELLS | 2 | 4 | 6 | 8 | 10 |
| CONVENTIONAL SCRUBBER | 25 H.P. | 40 H.P. | 60 H.P. | 75 H.P. | 100 H.P. |
| FLUID BED SCRUBBER | 15 H.P. | 25 H.P. | 40 H.P. | 50 H.P. | 75 H.P. |
| ENERGY SAVINGS | 40.0% | 37.5% | 33.3% | 33.3% | 25.0% |

There is a further indirect saving of electrical energy due to reduced volume of exhaust air going to the cloth filter baghouse. The present invention has been tested in a full size pilot installation at a production foundry reclaiming the waste clay and resin bonded system sand from its brass and bronze casting operations. The test runs confirmed the improved consistency and quality of the reclaimed sand and the saving in Kilowatt Hours of electrical energy per ton of sand processed.

It should be understood that the foregoing description and examples are given for the purpose of illustration and that the invention includes all modification and equivalents within the scope of the appended claims.

While the invention is shown in only two of its forms, it is not thus limited but is susceptible to various changes and modifications dictated by the physical properties of the particulate material to be processed by the method.

What is claimed is:

1. A method for both cooling and pneumatically scrubbing a calcined, particulate material having cracks, crevices and cleavage plains and having minute amounts of inorganic contaminants and metallic oxides adhering to the cracks, crevices and cleavage plains, the method comprising the steps of:

passing the particulate material at a temperature in the range from about 700 to 1500 degrees F. to a primary cooling zone of a cooler-scrubber unit having an interior with an inlet opening and an outlet opening, the interior of the cooler-scrubber unit forming a continuous bed of particulate material between the inlet and outlet openings thereof;

introducing fluidizing air to the continuous bed of particulate material to form a fluid bed whereby particulate material entering the inlet opening is moved in the direction of the outlet opening;

drawing off fluidizing air by means of a primary cooling zone exhaust duct provided at a first location within the cooler-scrubber unit at a predetermined rate to thereby create a controlled negative mechanical draft within the interior of the cooler-scrubber unit;

locating a plurality of cooling tubes within the fluid bed located within the interior of the cooler-scrubber unit and circulating a cooling medium within the cooling tubes, wherein the particulate material passing through the interior of the cooler scrubber unit between the inlet opening and outlet openings thereof contacts the cooling tubes, contact with the cooling tubes as well as contact with the fluidizing air serving to continually cool the particulate material to a temperature within the range from about 85 to 120 degrees F.;

passing the particulate material from the primary cooler zone of the cooler-scrubber unit to a scrubbing zone located within the interior of the unit, the scrubbing zone including at least one blast nozzle which forces air under pressure upwardly within an associated vertically oriented blast tube toward a target plate to promote the release of kinetic energy upon impact of the particulate material with the target plate, whereby the cracks, crevices and cleavage plains of the particulate material are scoured to remove the minute traces of inorganic contaminants and metallic oxides;

allowing the particulate material to fall to the continuous bed within the scrubbing zone; and recirculating the particulate material within the scrubbing zone until captured by an overflow current.

2. The method of claim 1, wherein a cooling zone exhaust duct damper is provided in the primary cooling zone exhaust duct of the cooler-scrubber unit, the cooling zone exhaust duct damper being adjustable for controlling the rate of elutriation of inorganic fines and silica fines produced in the primary cooling zone during the passage of the particulate material from the inlet opening toward the outlet opening of the cooler-scrubber unit.

3. The method of claim 2, wherein the particulate material being accelerated by the blast nozzle within the blast tube is entrained with returned particles prior to being rapidly accelerated by the blast tube to thereby promote release of kinetic energy upon impact with the target plate.

4. The method of claim 3, further comprising the steps of connecting the scrubbing zone of the cooler-scrubber unit to a scrubber exhaust duct which communicates with the cooling zone exhaust duct of the primary cooling zone, and creating a negative pressure within a main exhaust duct to capture unwanted fines as well as scoured inorganic contaminates and metallic oxides present within the scrubbing zone.

5. The method of claim 4, wherein the particulate material in the scrubbing zone of the cooler-scrubber unit is entrained by the blast nozzle and propelled into the blast tube via a wear collar prior to being rapidly accelerated up the interior of the blast tube, and wherein the blast tube is provided with a tapered choke section at an upper end thereof to concentrate the particulate material as it emerges from the blast tube to impact the target plate in order to concentrate the release of kinetic energy over a definitive area of the target plate.

6. The method of claim 5, wherein the particulate material in the scrubbing zone has an average particle size, the average particle size being determined by setting the position of a plenum pressure control damper provided in a branch exhaust duct communicating with the main exhaust duct together with the cooling zone exhaust duct damper provided in the cooling zone exhaust duct from the primary cooling zone.

7. The method of claim 1, wherein the particulate matter in the scrubbing zone is made up of small and large particles having an average particle size, the average small particle size being in the range from 40 to 60 microns and wherein the average large particle size is in the range from 150 to 600 microns.

8. The method of claim 1, wherein the average small particle velocity in the blast tube is in the range of 90 to 115 feet per second.

9. The method of claim 1, wherein the average large particle velocity in the blast tube is in the range of 75 to 90 feet per second.

* * * * *